United States Patent [19]

Numao

[11] Patent Number: 4,929,058

[45] Date of Patent: May 29, 1990

[54] METHOD FOR DRIVING A DISPLAY DEVICE

[75] Inventor: Takaji Numao, Tenri, Japan

[73] Assignee: Sharp Kabushiki Kaisha, Osaka, Japan

[21] Appl. No.: 238,257

[22] Filed: Aug. 30, 1988

[30] Foreign Application Priority Data

Aug. 31, 1987 [JP] Japan ............................. 62-218477

[51] Int. Cl.$^5$ ............................. G02F 1/13; G09G 3/36
[52] U.S. Cl. ............................. 350/333; 350/350 S; 340/784
[58] Field of Search .................. 350/333, 33 R, 350 S, 350/334; 340/784, 805

[56] References Cited

U.S. PATENT DOCUMENTS 4,508,429 4/1985 Nagae et al. ..................... 350/333 X
4,709,995 12/1987 Kuribayashi ..................... 350/333 X Primary Examiner—Stanley D. Miller
Assistant Examiner—Huy K. Mai
Attorney, Agent, or Firm—Birch, Stewart, Kolasch & Birch

[57] ABSTRACT

A driving method for a display device is disclosed. The display device includes column electrodes and row electrodes, both laid in a matrix of columns and rows, and a display picture element disposed at each intersection between the column and row electrodes and adapted to be selectively set in one of bright an dark memory states. The driving method includes the steps of dividing the column electrodes into K groups of column electrodes; defining the number Z of column electrode lines constituting each group of the column electrodes rendering one frame period; selecting a predetermined one of the K groups of the column electrodes for a time width $ZT_0$ of each of the blocks so that each picture element in the selected one of the groups of the column electrodes can be set in one of the bright and dark memory states; and selecting a number of times, not smaller than n, the K groups of the column electrodes, during each one-frame period $T_F$, will operate according to a predetermined sequence.

6 Claims, 10 Drawing Sheets

METHOD FOR DRIVING A DISPLAY DEVICE

BACKGROUND OF THE INVENTION

The present invention relates to a driving method used in a liquid crystal display device utilizing, for example, a ferroelectric crystal, for accomplishing, according to time sharing method, a display of plural gradations.

(Description of the Prior Art)

Figure 7:
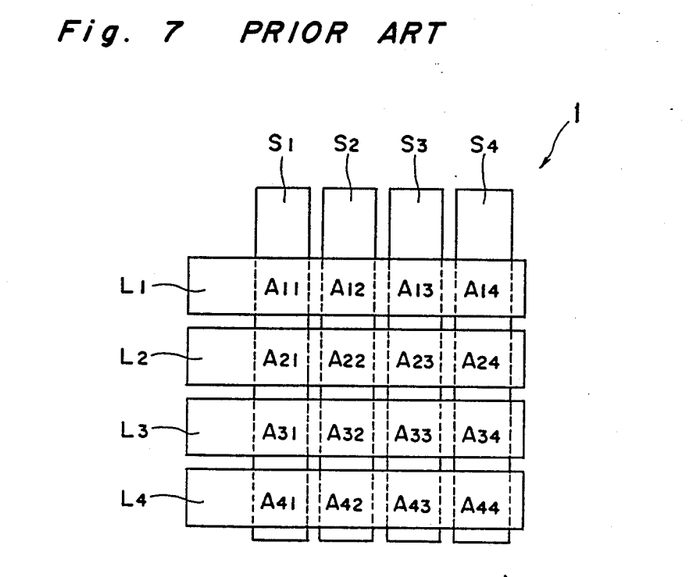
FIG. 7 is a schematic diagram showing the typical prior art liquid crystal display device.

An example of prior art liquid crystal display device is schematically shown in FIG. 7. The liquid crystal device 1 shown therein includes a plurality of, for example, four, scanning electrodes $L_p$ (p=1, 2, 3 and 4) and a plurality of signal electrodes $S_j$ (j=1, 2, 3 and 4) arranged in a matrix fashion, and a picture element $A_{pj}$ made of ferroelectric crystal and disposed at each of the points of intersection between the scanning electrodes $L_p$ and the signal electrodes $S_j$.

This prior art liquid crystal display device has such a property that, when a voltage in excess of a first driving voltage Vth is applied to a selected one of the picture elements $A_{pj}$, a bright memory condition can be established, and when a voltage lower than a second driving voltage $-$Vth is applied, a dark memory condition can be established.

Figure 8:
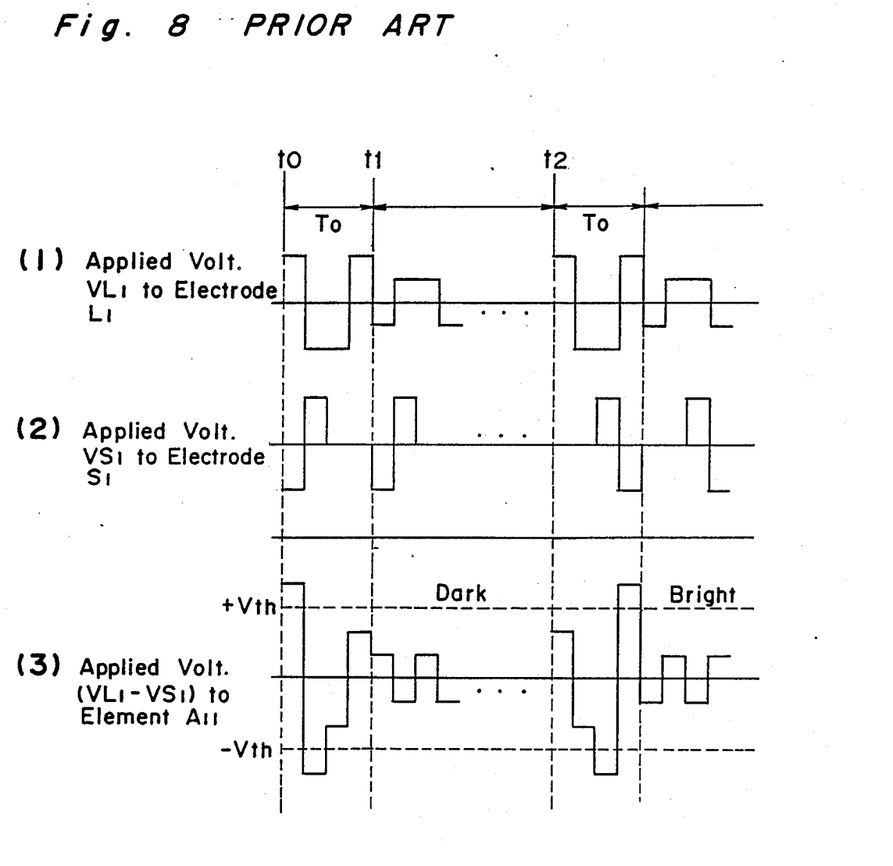
FIG. 8 is a diagram showing waveforms used to explain the operation of the prior art liquid crystal display device.

FIG. 8 illustrates waveforms used to explain the operation of the liquid crystal display device 1. Waveform (1) and (2) shown in FIG. 8 represent those of voltages $VL_1$ and $VS_1$ applied respectively to the scanning electrode $L_1$ and the signal electrode $S_1$, and a waveform (3) shown in FIG. 8 represents that of a voltage $VL_1 - VS_1$ applied to the picture element $A_{11}$.

A selection time $T_0$ between a timing t0 and a timing t1 is a period during which the scanning electrode $L_1$ is selected. If a non-selection condition, in which the scanning electrode $L_1$ is not selected is established after the selection time $T_0$, the voltage $VL_1 - VS_1$ applied to the picture element $A_{11}$ has been lowered below the second driving voltage $-$Vth (subsequent to the timing t1), the picture element $A_{11}$ can assume a dark memory condition until the timing (t2) at which the next succeeding selection time $T_0$ starts. Similarly, the waveforms of the respective voltages exhibited subsequent to the timing t2 are those permitting the picture elements $A_{11}$ to assume a bright memory condition.

A method of effecting a display of $2^3$ gradations in this liquid crystal display device according to a conventional time sharing method will now be described.

Figure 9A:
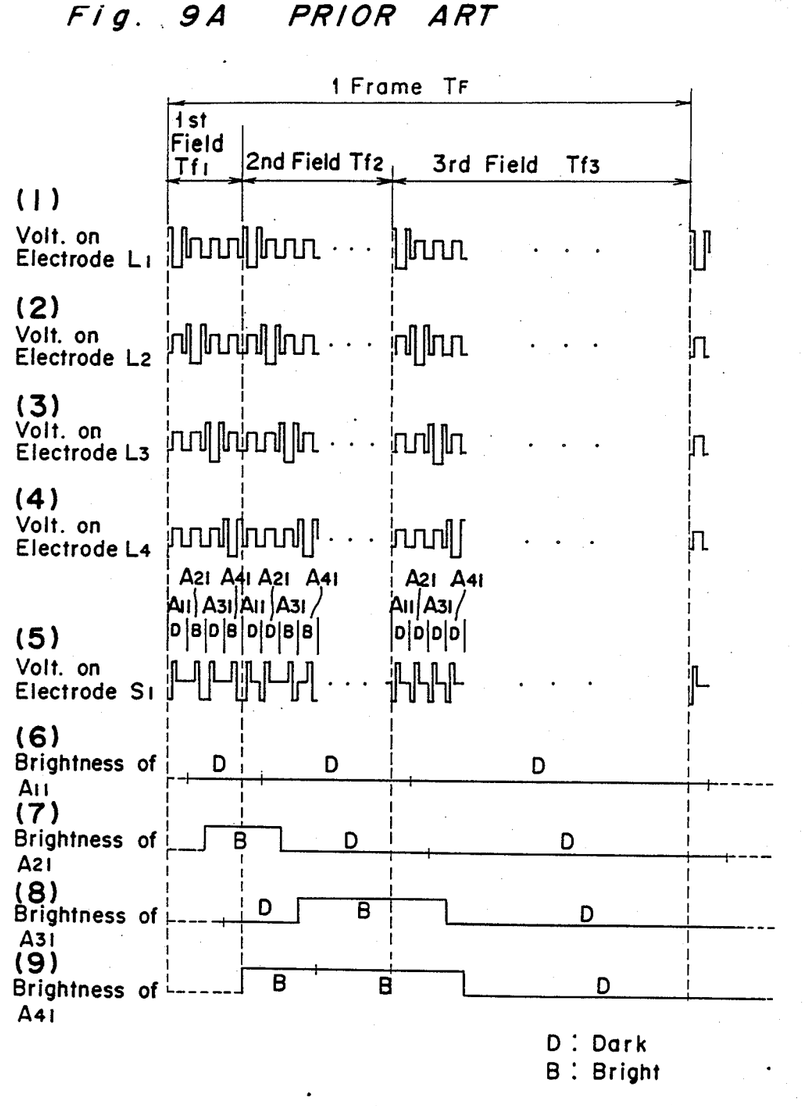
FIGS. 9A and 9B are diagrams showing the waveforms used to explain the conventional driving method.
Figure 9B:
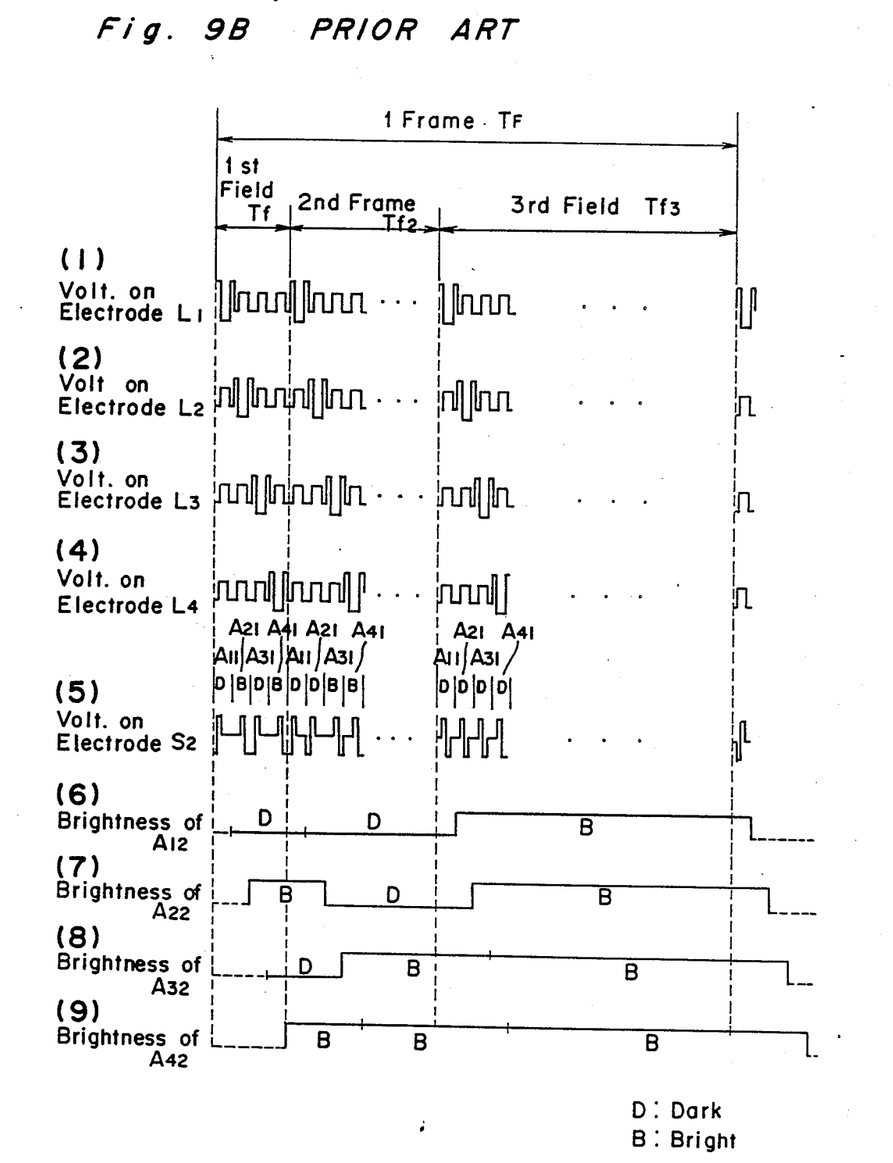

FIGS. 9A and 9B illustrate respective waveforms used to explain the conventional driving method for accomplishing the display of $2^3$ gradations with the use of the liquid crystal display device 1. Waveforms (1) to (4) shown in each of FIG. 9A and FIG. 9B represent those of voltages applied respectively to the scanning electrodes $L_1$ to $L_4$, and waveforms (5) shown in FIGS. 9A and 9B represent those of voltages applied to the scanning electrodes $S_1$ and $S_2$ respectively. Waveforms (6) to (9) shown in FIG. 9A represent the brightness of the respective picture elements $A_{11}$, $A_{21}$, $A_{31}$ and $A_{41}$, whereas waveforms (6) to (9) shown in FIG. 9B represent the brightness of the respective picture elements $A_{12}$, $A_{22}$, $A_{32}$ and $A_{42}$.

When the liquid crystal display device 1 is utilized to effect the display of $2^n$ gradations according to the time sharing method, as shown in FIGS. 9A and 9B, one frame has to be divided into three fields and arrangement must be made such that respective time widths $T_{f1}$, $T_{f2}$ and $T_{f3}$ of the first, second and third fields must have the following relationship.

$$T_{f1}:T_{f2}:T_{f3}=1:2:4 \tag{4}$$

The selection time $T_0$ during which the scanning electrode $L_1$ is selected is made equal to the selection time during which the other scanning electrodes $L_2$ to $L_4$ are selected. Accordingly, the time width $T_{f1}$ of the first field has the following relationship with the selection time $T_0$:

$$T_{f1}=4T_0 \tag{5}$$

From the equations (5) and (4), the respective time widths $T_{f2}$ and $T_{f3}$ of the second and third fields such as expressed below:

$$T_{f2}=2T_{f1}=8T_0 \tag{6}$$

$$T_{f3}=4T_{f1}=16T_0 \tag{7}$$

Accordingly, the time width $T_F$ of one frame is as follows:

$$\begin{aligned} T_F &= T_{f1} + T_{f2} + T_{f3} \\ &= 7 \times 4T_0 = 28T_0 \end{aligned} \tag{8}$$

In each field so determined, by selectively causing the arbitrarily chosen picture elements to be set in the bright or dark memory conditions, the display of $2^3 = 8$ gradations can be realized. By way of example, as shown by the waveform (6) in FIG. 9A, it is possible to render the picture element $A_{11}$, which is in the dark memory condition at each of the first to third fields, to represent a zero gradation and also to render the picture element $A_{21}$, which is in the bright memory condition at the first field, but in the dark memory condition at each of the second and third fields, to represent a first gradation (see the waveform (7) in FIG. 9A). Similarly, as shown by the waveforms (8) and (9) in FIG. 9A, the second and third gradations are displayed at the picture elements $A_{31}$ and $A_{41}$. Similarly, as shown by the waveforms (6) to (9) in FIG. 9B, the fourth to seventh gradations can be displayed by the picture elements $A_{12}$ to $A_{42}$.

In general, in order for a liquid crystal display device having a number Y of scanning electrodes to display $2^n$ gradations (n being a positive integer), one frame is composed of n fields and the time width $T_{fi}$ of the i-th field has the following relationship with the time width $T_{f1}$ of the first field:

$$T_{fi}=2^{(i-1)} \times T_{f1} \tag{9}$$

The time width $T_{f1}$ of the first field can be expressed by the following equation (10) and, therefore, the time width $T_{Fn}$ of one frame can be expressed by the following equation (11).

$$T_{f1} = YT_0 \tag{10}$$

-continued $$T_{Fn} = \sum_{l=1}^{n} T_{fl} = \sum_{l=1}^{n} 2^{(l-1)} YT_0 \quad (11)$$
$$= (2^n - 1) YT_0$$

If the number Y of the scanning electrodes is selected to be 400 and the number of gradations is $2^n = 2^1 - 2^8$, the number n of field and the time width $T_S$ of each frame have such relationships as tabulated in Table 1 below.

TABLE 1

| Number of Graduations $2^n$ | Number of Fields | Time Width $T_F$ of Each Frame |
|---|---|---|
| $2^1$ | 1 | 400 $T_o$ |
| $2^2$ | 2 | 1200 $T_o$ |
| $2^3$ | 3 | 2800 $T_o$ |
| $2^4$ | 4 | 6000 $T_o$ |
| $2^5$ | 5 | 12400 $T_o$ |
| $2^6$ | 6 | 25200 $T_o$ |
| $2^7$ | 7 | 50800 $T_o$ |
| $2^8$ | 8 | 102000 $T_o$ |

In the liquid crystal display device 1 (Y=4) shown in FIG. 7, in order to accomplish a display of $2^n = 8$ gradations, the time width $T_{F3}$ of one frame must be:

$$T_{F3} = (2^3 - 1) = 4 = T_0 = 28 T_0 \quad (12)$$

of this time width $T_{F3}$ of one frame, the sum of times during which the scanning electrodes $L_1-L_4$ are selected requires $4 \times T_0$ (seconds) for each field and is therefore $3 \times 4T_0 = 12T_0$ (seconds), the remaining $16T_0$ seconds being utilize for nothing associated with the display.

In general, in order for the liquid crystal display device having the Y scanning electrodes to effect a display of $2^n$ gradations, if the sum of the selection times of the scanning electrodes $L_1-L_Y$ at the i-th field is defined as the actual application time $T_{ri}$ of the i-th field, the actual application time $T_R$ of one frame can be calculated by the following equation.

$$T_R = \sum_{i=1}^{n} T_{ri} = \sum_{i=1}^{n} \sum_{l=1}^{Y} T_0 = nYT_0 \quad (13)$$

Accordingly, the proportion of the actual application time $T_{Rn}$ relative to the time width $T_{Fn}$ of one frame can be expressed as follows.

$$\frac{T_{Rn}}{T_{Fn}} = \frac{nYT_0}{(2^n - 1)YT_0} = \frac{n}{2^n - 1} \quad (14)$$

Thus, according to the conventional time-shared multi-gradation display system, the greater the number of gradations $2^n$, the smaller the proportion of the actual application time relative to the time width of one frame, and therefore, it cannot be said that the multi-gradation display is effected efficiently.

Figure 10:
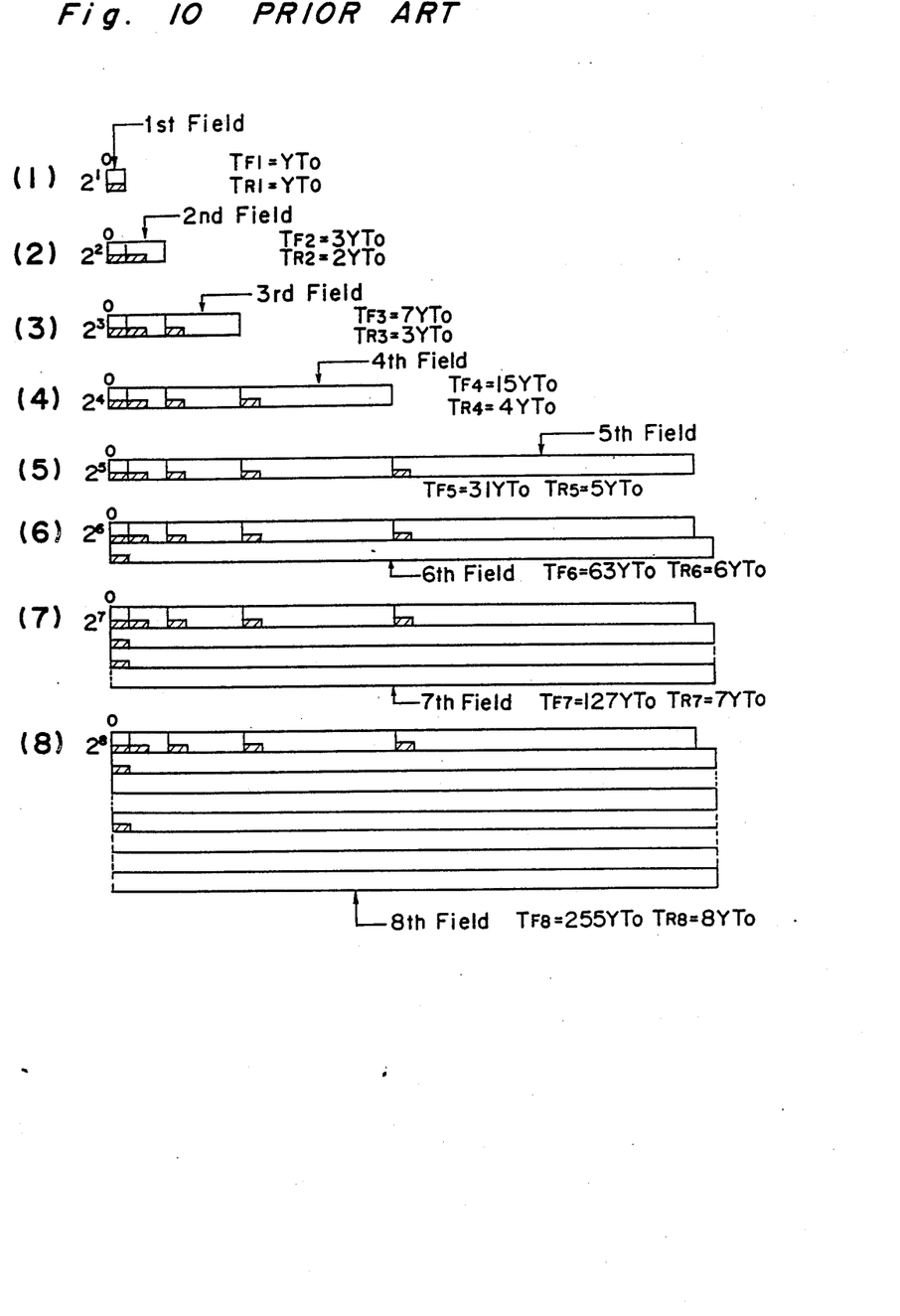
FIG. 10 is a diagram used to explain the principle of the conventional driving method.

For the purpose of reference, the relationship between the time width $T_{Fn}$ of one frame and the actual application time $T_R$ of one frame is diagrammatically shown in FIG. 10. Symbols (1) to (8) used in FIG. 10 represent respective displays of $2^1$ gradation to $2^8$ gradations, and each time band representative of the actual application time is shown by the associated hatching.

SUMMARY OF THE INVENTION

The present invention has been devised with a view to substantially eliminating the above discussed problems. The object of the present invention, in a preferred embodiment, is to provide a driving method for a display device wherein the efficiency, in terms of time, can be improved when a multi-gradation display is effected.

In order to accomplish the above described object, the present invention provides a driving method for a display device which comprises column electrodes and row electrodes, both laid out in a matrix form of columns and rows, and a display picture element disposed at each point of intersection between the column which is row electrodes and adapted to be selectively set in one of bright and dark memory states. The driving method herein disclosed comprises:

dividing, when a display of $2^n$ (n being an integer not smaller than 3) is to be effected, the column electrodes into K groups of column electrodes wherein K is an integer not smaller than 2 and has the following relationship;

$$K \leq \frac{(2^n - 1)}{n} \quad (1)$$

defining the number Z of column electrode lines constituting each group of the column electrodes to have the following relationship;

$$Z \geq \frac{Y}{K} \quad (2)$$

wherein Z is a positive integer and Y represents the number of the column electrodes;

rendering one frame period $T_F$, composed of ($2^n$31 1) blocks, to have the following relationship, $$T_F = (2^n - 1) ZT_0 \quad (3)$$

wherein $T_0$ represents the selection time during which the picture elements on each of the column electrodes are selectively set in one of the bright and dark memory states;

selecting a predetermined one of the K groups of the column electrodes for a time width $ZT_0$ of each of the blocks so that each picture element on the selected one of the groups of the column electrodes can be set in one of the bright and dark memory states; and selecting a number of times not smaller than n the K groups of the column electrodes during each one-frame period $T_F$ according to a predetermined sequence.

The display device utilized in the practice of the present invention is such that each of the display picture elements provided at the respective points of intersection between the plural column electrodes and the plural row electrodes can be arbitrarily set in one of the bright and dark memory states. In order for this display device to effect a display of $2^n$ (n being an integer not smaller than 3) gradations, and in accordance with the driving method of the present invention, the plural column electrodes are divided into the K groups of the column electrodes, wherein K is an integer not smaller than 2 and is equal to or smaller than $2^n - 1$ as shown by the equation (1). Therefore, of the groups of the column electrodes so divided can be driven individually in a manner as will be described later.

Also, the number Z of column electrodes constituting each group of the column electrodes is selected so as to be equal to or greater than Y/K as shown by the equation (2), and the one-frame period $T_F$ comprised of the $(2^n-1)$ blocks is selected so as to be equal to $(2^n-1)ZT_0$ as shown by the equation (3).

Thus, by dividing the display device into the K groups of the column electrodes, selecting a desired one of the K groups of the column electrodes, and setting each of the picture elements on the selected group of the column electrodes in one of the bright and dark memory states for the time width $ZT_0$ of each of the blocks, the device can be driven. Therefore, when one of the groups of the column electrodes is to be selected, the time required to select all of the K groups of the column electrodes can be considerably reduced if they are selected so as to not overlap over each other with the passage of time during the time width $ZT_0$ of each block.

BRIEF DESCRIPTION OF THE ACCOMPANYING DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
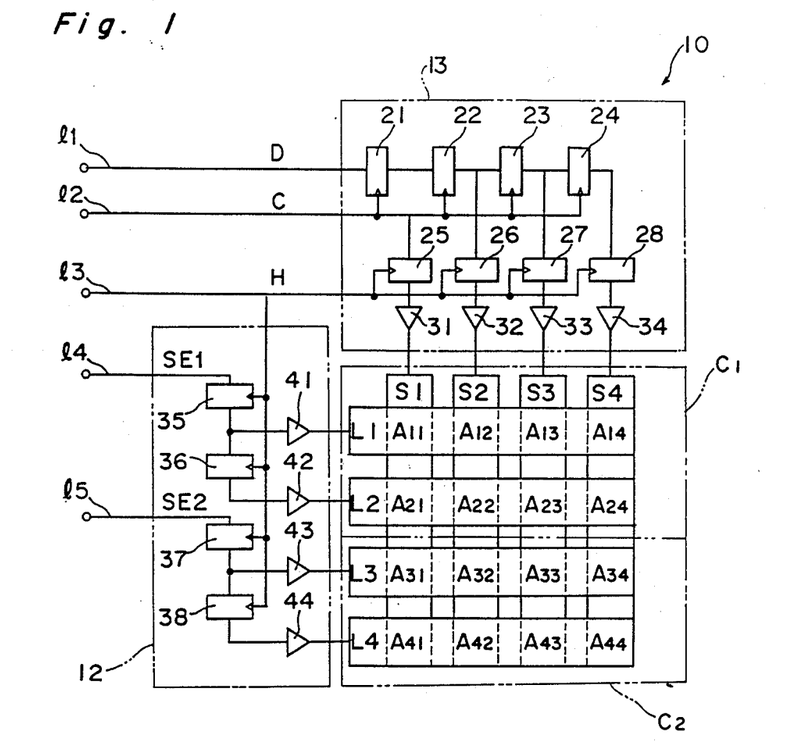
FIG. 1 is a schematic block circuit diagram showing a liquid crystal display device used in the practice of the present invention.
Figure 2:
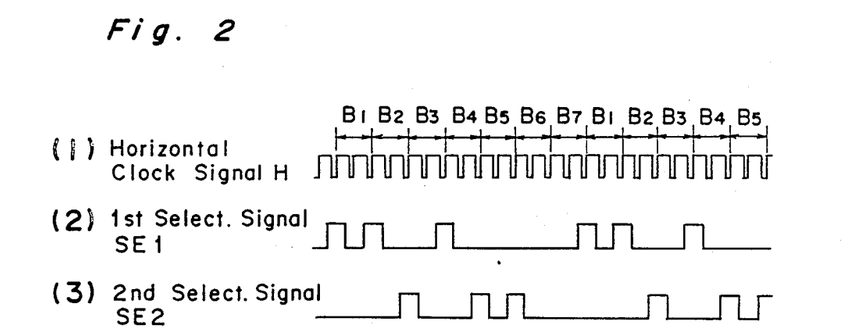
FIG. 2 is a diagram showing respective waveforms of signals applied to the display device of FIG. 1.

FIG. 1 illustrates, in a schematic block representation, a liquid crystal display device 10 used in the preferred embodiment of the present invention. FIG. 2 is a diagram showing the respective waveforms of signals applied to the liquid crystal display device 10. The display device 10 comprises a plurality of, for example, four, scanning electrodes $L_1$ to $L_4$ (or scanning electrodes L when reference is made to these electrodes collectively) and four signal electrodes $S_1$ to $S_4$ (or signal electrodes S when reference is made to these electrodes collectively) laid so as to alternately intersect the scanning electrodes $S_1$ to $S_4$ in a matrix of columns and rows. Further, a picture element $A_{pj}$ ($=1, 2, 3$ and 4) made of ferroelectric liquid crystal, is disposed at each point of intersection between the scanning electrodes L and the signal electrodes S.

Voltages of predetermined levels are selectively supplied from a scanning electrode drive circuit 12 and a signal electrode drive circuit 13 respectively, to each scanning electrode L and each signal electrode S as will be described later. Respective waveforms of these voltages applied by the electrode drive circuits 12 and 13 to each electrode will now be described in detail.

First, a basic idea of the present invention will be described.

Figure 4:
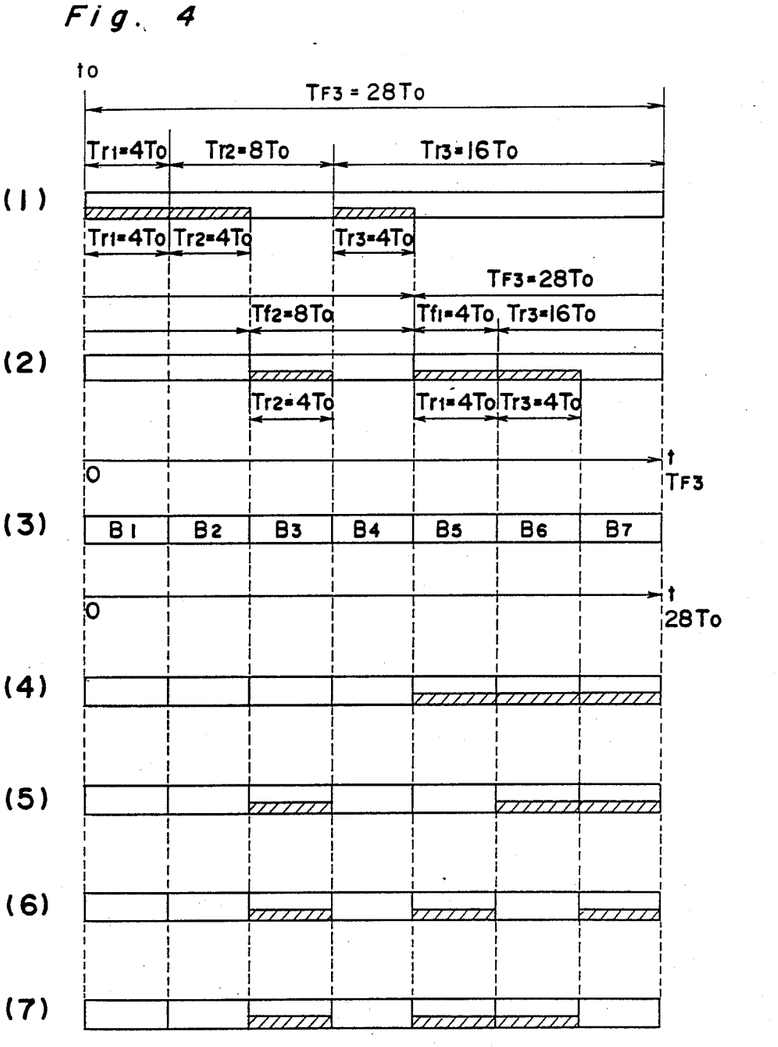
FIG. 4 is a diagram schematically illustrating a display pattern of $2^3$ gradations.

FIG. 4 is a diagram schematically illustrating a display pattern of $2^3=8$ gradation which the display device 10 can achieve. In order for the display device 10 to effect a display of $2^3=8$ gradations, one picture can be composed at a time width $T_{F3}$ of one frame comprised of first to third fields. The time widths $T_{f1}$, $T_{f2}$ and $T_{f3}$ of the first to third fields have the following relationship;

$$T_{f1}:T_{f2}:T_{f3}=1:2:4 \tag{15}$$

and the time width $T_{f1}$ of the first field is set so as to be 4 times the selection time $T_0$ during which each scanning electrode $L_1$ to $L_4$ is individually selected, that is, $T_{f1}=4T_0$.

The time width $T_{F3}$ of one frame, so defined, is divided into 7 equal fractions which are defined as the first to seventh blocks $B_1$ to $B_7$ repeated at intervals of a time width of $T_{f1}=4T_0$ between the timing t0 to the first field. (See (3) in FIG. 4.)

(1) in FIG. 4 illustrates the display pattern which provides this basis. In this display pattern, at each field, the time during which the scanning electrodes $L_1$ to $L_4$ are selected, that is, the actual application time during which a driving voltage is actually applied to each scanning electrode, is set for each of the first to fourth blocks $B_1$ to $B_4$ as shown by the respective hatching in FIG. 4.

If a display pattern is determined in which the actual application time will not overlap with the display pattern shown in FIG. 4, and in which the display can be effected in 8 gradations, a display pattern such as shown by (2) in FIG. 4 can be obtained. Hereinafter, a process of determining this display pattern will be discussed.

In the display pattern shown by (1) in FIG. 4, the number of combinations available of any arbitrarily chosen three blocks of the third, fifth, sixth and seventh blocks $B_3$, $B_5$, $B_6$ and $B_7$, each of which does not fall within the actual application time, is $_4C_3=4$. These four display patterns are shown respectively by (4) to (7) in FIG. 4. Of these four display patterns, the display pattern in which the time widths $T_{f1}$, $T_{f2}$ and $T_{f3}$ of the first to third fields can satisfy the equation (15), is the one shown by (7) in FIG. 4. That is, this display pattern is identical with the display pattern shown by (2) in FIG. 4 and referred to hereinabove.

Figure 5:
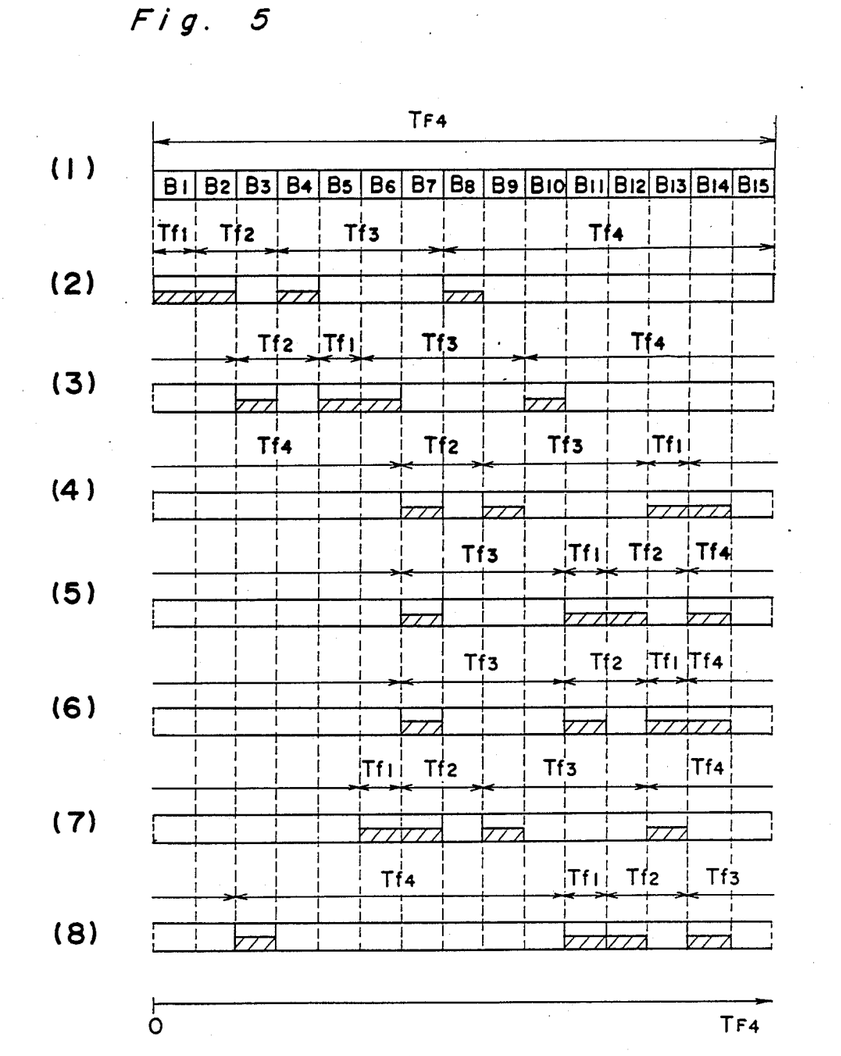
FIG. 5 is a diagram schematically illustrating a display pattern of $2^4$ gradations.

FIG. 5 is a diagram schematically illustrating examples of display patterns necessitated for the liquid crystal display device 1 so as to effect a display in $2^4=16$ gradations. In this case, the time width $T_{f4}$ of one frame is divided into 15 ($=2^4-1$) equal fractions of which are, in a manner similar to the previously discussed 8-gradation display pattern, defined as the first to fifteenth blocks $B_1$ to $B_{15}$ repeated at intervals starting from the timing t0 (See (1) in FIG. 5). The actual application time is set in each of the first, second, fourth and eighth blocks $B_1$, $B_2$, $B_4$ and $B_8$ so that the display pattern which provides the basis, and is shown by (2) in FIG. 5, can be synthesized.

In the basic display pattern referred to above, the number of combinations available of an arbitrarily chosen four blocks of the third, fifth, sixth, seventh, ninth, tenth, eleventh, twelfth, thirteenth, fourteenth and fifteenth blocks. $B_3$, $B_5$, $B_6$, $B_7$, $B_9$, $B_{10}$, $B_{11}$, $B_{12}$, $B_{13}$, $B_{14}$ and $B_{15}$ is ${}_{11}C_4 = 330$. Of these 330 display patterns, some display patterns such as, for example, those shown by (3) to (8) in FIG. 5, can be found wherein, as is the case with the display pattern providing the basis, the time widths $T_{f1}$ to $T_{f4}$ of the respective first to fourth fields have the following relationship:

$$T_{f1}:T_{f2}:T_{f3}:T_{f4} = 1:2:4:8 \quad (16)$$

Thus two display patterns in which the respective actual application times do not overlap with each other can be found out of some such display pattern.

Figure 6:
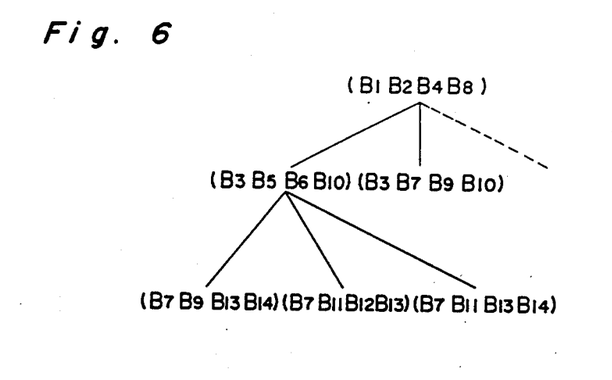
FIG. 6 is a diagram used to explain the concept of the present invention.

This search method will now be described with reference to FIG. 6. In the following description, however, the selected display pattern will be designated by reference characters used to denote the blocks corresponding to the respective actual application times. By way of example, the display pattern providing the basis, as shown by (2) in FIG. 5, will be designated by ($B_1$, $B_2$, $B_4$, $B_8$).

At the outset, the basic display pattern ($B_1$, $B_2$, $B_4$, $B_8$) is selected, followed by the selection of the display pattern ($B_3$, $B_5$, $B_6$, $B_{10}$) shown by (3) in FIG. 5. This the display pattern which is selected out of the 330 $(={}_{11}C_4)$ display patterns and in which the third block $B_3$, is included and the time widths $T_{f1}$ to $T_{f4}$ of the respective first to fourth fields satisfy the equation (16). Finally, out of the remaining blocks, (the seventh block $B_7$, the ninth block $B_9$, and the eleventh to fifteenth blocks $B_{11}$ to $B_{15}$), the display pattern which includes the seventh block $B_7$ and, at the same time, satisfies the equation (16), (the display pattern ($B_7$, $B_9$, $B_{13}$, $B_{14}$) shown by (4) in FIG. 5) is selected. The three display patterns ($B_1$, $B_2$, $B_4$, $B_8$), ($B_3$, $B_5$, $B_6$, $B_9$) and ($B_7$, $B_9$, $B_{13}$, $B_{14}$) are recorded as a combination of these display patterns.

Then, using the display pattern ($B_3$, $B_5$, $B_6$, $B_{10}$) shown by (3) in FIG. 5 as a basic display pattern, a search is made to find the display pattern other than the display pattern ($B_7$, $B_9$, $B_{13}$, $B_{14}$) shown by (4) in FIG. 5, which satisfying the equation (16). Thereafter, the display pattern ($B_7$, $B_{11}$, $B_{12}$, $B_{14}$) shown by (5) in FIG. 5, and these three display patterns ($B_1$, $B_2$, $B_4$, $B_8$), ($B_3$, $B_5$, $B_6$, $B_{10}$) and ($B_7$, $B_{11}$, $B_{12}$, $B_{14}$) are recorded as another one combination of display patterns.

In this way, using the display pattern ($B_3$, $B_5$, $B_6$, $B_{10}$) shown by (3) in FIG. 5 as a basic display pattern, all of the display patterns which satisfy the equation (16) are recorded. Then, if all of the display patterns which satisfy the equation (16) are successively recorded in such a way as to select, for example, the display pattern ($B_3$, $B_7$, $B_9$, $B_{10}$) with the display pattern ($B_1$, $B_2$, $B_4$, $B_8$), shown by (2) in FIG. 5, are used as basic display pattern again, some combinations of the display patterns can be found herein no actual application time overlaps with each other occur.

Generally, when the display in $2^n$ gradations is to be accomplished, the number M of the combinations of the display patterns in which the time width $T_{fi}$ of the i-th field satisfies the following equation (17) and in which the actual application times, do not overlap with each other, is a positive integer which satisfies the following equation (18).

$$T_{fi} = 2^{(i-1)} \times T_{f1} \quad (17)$$

$$M \leq \frac{2^n - 1}{n} \quad (18)$$

A method for driving the liquid crystal display device according to the present invention based on the foregoing concept will now be described.

Herein, a display method, employed in the liquid crystal display device utilizing the Y scanning electrodes, for effecting a display in the $2^n$ gradations according to a time sharing method, will be described. In the first place, the time width $T_{Fn}$ of one frame is divided into $(2^n-1)$ equal blocks which are respectively defined as the first block $B_1$, the second block $B_2$, ... and the $(2^n-1)$th block $B_{2^n-1}$) according to the time sequence.

At the outset, the display pattern ($B_{20}$, $B_{21}$, ..., $B_{2n-1}$) which provides the basis is selected out of the $(2^n-1)$ blocks and then, out of the remaining $(2^n-1-n)$ blocks, the display pattern ($B_a$, $B_b$, $B_c$, ... $B_g$, $B_h$) in which identical blocks do not overlap with each other is selected. It is, however, to be noted that, in this display pattern, the affix "a" represents an arbitrary positive integer other than $(2^0, 2^1, \ldots, 2^{n-1})$ and the affixes "b", "c", ..., "g" and "h" are selected to be respective positive integers which satisfy the following respective equations:

$$b = ROT(\alpha_1 + a, 2^n - 1) \quad (19.1)$$

$$c = ROT(\beta_2 + b, 2^n - 1) \quad (19.2)$$

.
.
.

$$h = ROT(\alpha_{n-1} + g, 2^n - 1). \quad (19.n-1)$$

However, in the following equation $$z = ROT(x, y) \quad (20)$$

z is defined as a reminder which is given when x is divided by y. Also, in the equation (19), $(\alpha_1, \alpha_2, \ldots, \alpha_{n-1})$ correspond respectively to $(2^0, 2^1, 2^2, \ldots, 2^{n-1})$ respectively. In the equation (20), however, all of x, y and z are a positive integer and, when x=y, $$ROT(x, y) = x \quad (21)$$

The display pattern, which satisfies those conditions, can be found in a maximum number of (M-1) wherein M represents a positive integer that satisfies the equation (18).

Then, the Y scanning electrodes are divided into K groups $C_1, C_2, \ldots, C_k$ of the scanning electrodes wherein K is a positive integer and wherein:

$$K \leq M \quad (22).$$

Further, the number Z of the scanning electrodes forming each of the groups thereof is selected so as to satisfy the following equation:

$$Z \geq \frac{Y}{K}. \quad (23)$$

In the liquid crystal display device now under discussion, if no positive integer which satisfies the following relationship;

$$Z = \frac{Y}{K} \quad (24)$$

can be chosen, it is suggested to take into consideration a liquid crystal display device having a number Y1 of scanning electrodes which satisfies the following equation:

$$Y1 = ZK \quad (25).$$

The time width $T_{FN}$ is then set to have the following relationship:

$$T_{Fn} = (2^n - 1)ZT_0 \quad (26)$$

wherein $T_0$ represents the selection time for each of the scanning electrodes $L_1$ to $L_{Y1}$. Thus, the time width for each block is set to $ZT_0$ (second).

The operation based on the time sharing multi-plex multi-gradation display method according to the present invention will now be described.

At the outset, during a time zone of the block represented by the display pattern $(B_{20}, B_{21}, \ldots, B_{2^n-1})$ providing the basis, each of the scanning electrodes included in the electrode group $C_1$ is brought into a selected state. At the same time, during a time zone of each block represented by the display pattern $(B_{a1}, B_{b1}, \ldots, B_{h1})$ selected from the blocks other than the display pattern $(B_{20}, B_{21}, \ldots, B_{2^n-1})$, the scanning electrodes included in the electrode group $C_2$ are sequentially brought into a selected state. In this way, a display in $2^n$ gradations can be accomplished during the time width $T_{FN}$ of one frame as shown by the equation (26).

To describe of more detail, during each selection time $T_0$ (second) for the scanning electrodes starting from the timing $t = (2^0 3 1 1) = 0$ (second) at which one frame starts. The scanning electrodes included in the electrode group $C_1$ are sequentially brought into the selected state with the picture elements on such scanning electrodes consequently brought into the bright or dark memory state.

Subsequently, each selection time $T_0$ (second) starts from the timing $t = (2^2 - 1)ZT_0$ (second), the scanning electrodes included in the electrode group $C_1$ are brought into the selected state with the picture elements on such scanning electrodes brought into the bright or dark memory state. In this way, during each time zone for the blocks set for the display pattern $(B_{20}, B_{21}, \ldots, B_{2n}-1)$, the picture elements on the electrode group $C_1$ are caused to affect a display of gradations.

Also, at the same time, the scanning electrodes included in the electrode group $C_2$ are brought into the selected state from the timing $t = (a_1 - 1)ZT_0$ (second) (wherein $a_1$ is a positive integer other than $2^0, 2^1, \ldots, 2^{n-1}$) with the picture elements on such scanning electrodes brought into the bright or dark memory state. Thereafter, the scanning electrodes included in the electrode group $C_2$ are brought into the selected state from the timing $t = (b_1 - 1)ZT_0$ (second) (wherein 6, is a positive integer capable of satisfying the equation (19.1)). In this way, the picture elements on the scanning electrodes in the electrode group $C_2$ are sequentially caused to affect a display in $2^n$ gradations. Further, at the same time, the scanning electrodes included in the electrode group $C_3$ are sequentially brought into the selected state from the timing $t = (a_2 - 1)ZT_0$ (second) with the picture elements on such scanning electrodes in the electrode group $C_3$ consequently caused to affect a display in $2^n$ gradations.

As hereinabove described, the display in $2^n$ gradations can be accomplished by the picture elements in the scanning electrode groups $C_1$ to $C_K$ during the one-frame time width $T_{Fn}$ expressed by the equation (26).

For the purpose of reference, the relationships of the one-frame time width $T_F$ relative to the display in $2^1$ to $2^8$ gradations with the number Y of scanning electrodes taken as 400 are tabulated in Table 2 below.

TABLE 2

| Number of Gradations $2^n$ | $2^1$ | $2^2$ | $2^3$ | $2^4$ | $2^5$ | $2^6$ | $2^7$ | $2^8$ |
|---|---|---|---|---|---|---|---|---|
| n | 1 | 2 | 3 | 4 | 5 | 6 | 7 | 8 |
| $2^n - 1$ | 1 | 3 | 7 | 15 | 31 | 63 | 127 | 255 |
| Max. Division Number M | 1 | 1 | 2 | 3 | 6 | 10 | 18 | 31 |
| Number of Unit Electrodes Z | 400 | 400 | 200 | 134 | 67 | 40 | 23 | 13 |
| Frame Time Width $T_F$ | 400 $T_o$ | 1200 $T_o$ | 1400 $T_o$ | 2010 $T_o$ | 2077 $T_o$ | 2520 $T_o$ | 2921 $T_o$ | 3315 $T_o$ |

As can be understood from Table 2, the driving method according to the present invention exhibits the maximum effect when $n \geq 3$.

An example will now be described in which the above described driving method is applied to the liquid crystal display device 10 of the type shown in FIG. 1 for affecting the display in $2^3$ gradations.

In this example, the one-frame time width $T_{F3}$ is divided into $(2^3 - 1) = 7$ equal fractions which are respectively defined as the first to seventh blocks $B_1$ to $B_7$ a sequential order. Since $n = 3$, the equation (18) can be modified as follows:

$$M \leq \frac{(2^3 - 1)}{3} = 2.33 \quad (27)$$

and the maximum division number M gives 2. Then, the display pattern $(B_1, B_2, B_4)$ which provides the basis is secured out form the seven blocks, and the display pattern $(B_3, B_5, B_6)$ which satisfies the relationship shown by the equation (16) is secured out from the remaining four blocks. Since the maximum division number M is 2, no combination of display patterns greater than two can be available.

Then, the scanning electrodes $L_1$ to $L_4$ are divided into two scanning electrode groups. By way of example, the scanning electrodes $L_1$ and $L_2$ are allocated to a first scanning electrode group $C_1$ and the scanning electrodes $L_2$ and $L_4$ are allocated to a second scanning electrode group $C_2$. Accordingly, the number Z of the unit electrodes is two. For the selection time $T_0$ (second) of the scanning electrodes $L_1$ to $L_4$, the equation (26) gives the one-frame time width $T_{F3}$ as follows:

$$T_{F3}=(2^3-1)\times 2\times T_0=14T_0 \qquad (28).$$

Accordingly, the time width of each of the blocks is set to $2T_0$ (second).

Figure 3A:
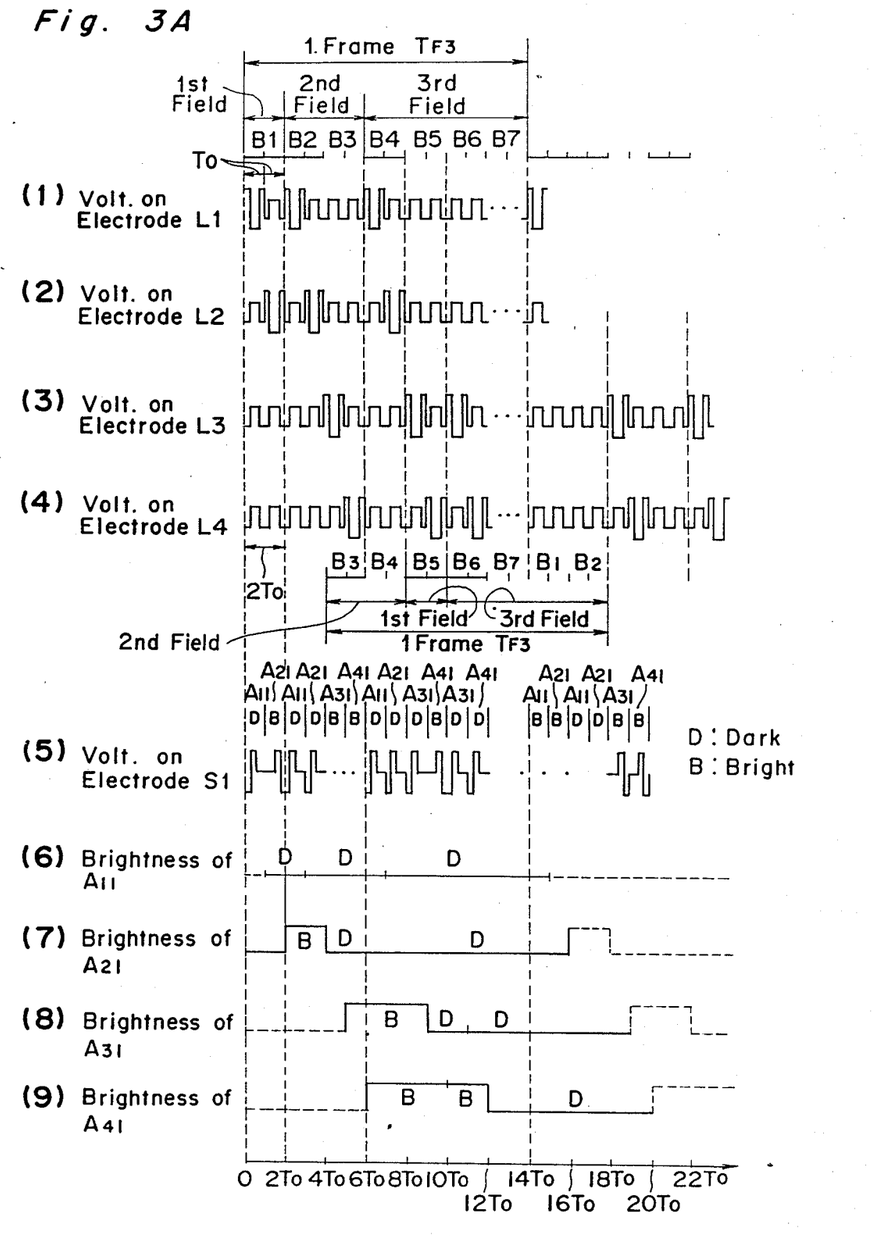
FIGS. 3A and 3B are diagrams showing various waveforms necessitated to accomplish the driving method of the present invention.
Figure 3B:
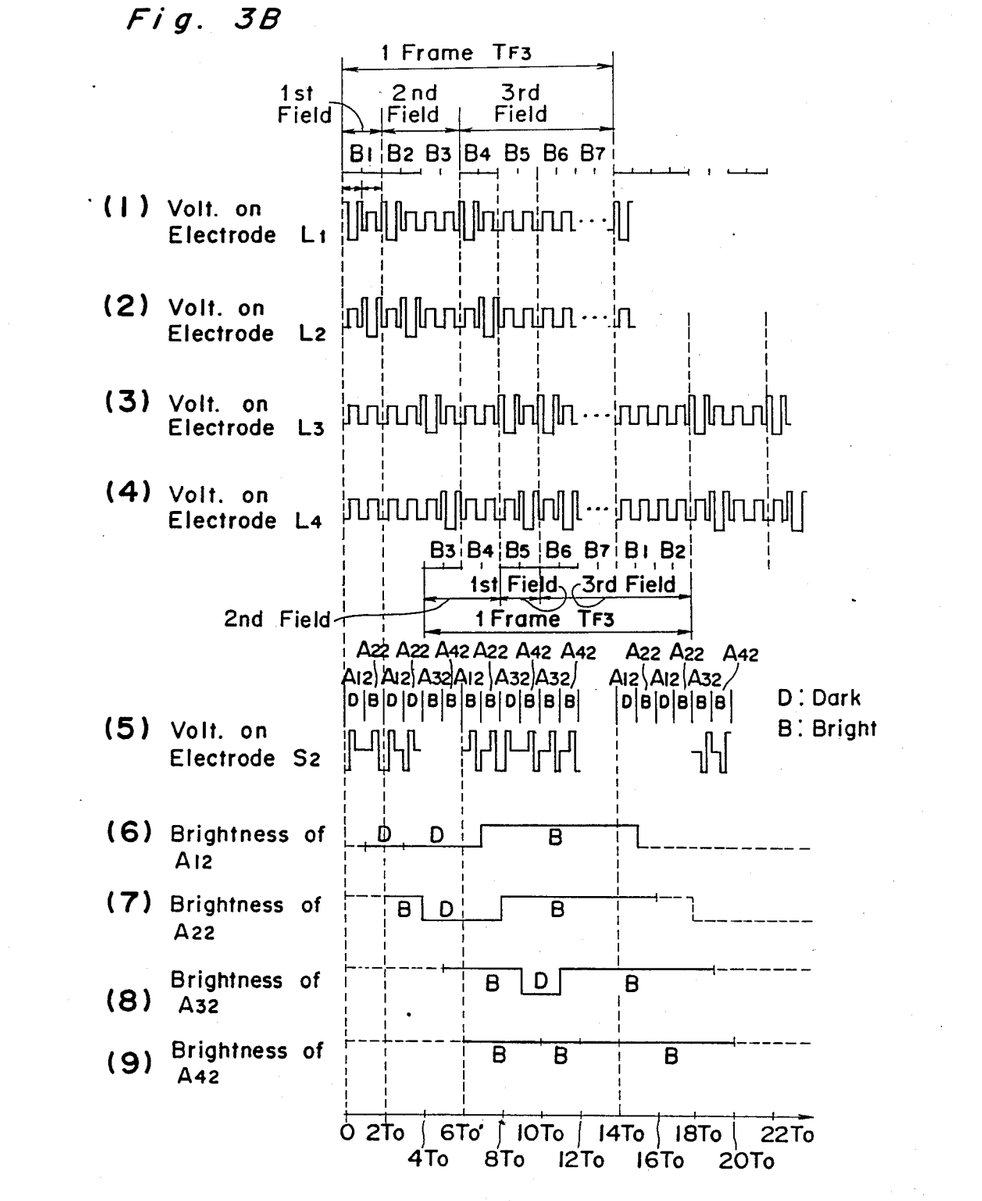

FIGS. 3A and 3B illustrate waveforms used to describe the operation of the liquid crystal display device 10. Waveforms of respective voltages applied to the scanning electrodes $L_1$ to $L_4$ are shown by (1) to (4) in FIG. 3A, whereas brightnesses of the respective picture elements $A_{11}$ to $A_{44}$ are shown by (6) to (9) in FIG. 3A. Shown by (1) to (4) in FIG. 3B are respective waveforms of the voltages applied to the scanning electrodes $L_1$ to $L_4$ (which are identical with the waveforms (1) to (4) in FIG. 3A), whereas a waveform of a voltage applied to the signal electrode $S_2$ is shown by (5) in FIG. 3B.

Referring now to FIGS. 3A and 3B, the details of the driving method in this preferred embodiment of the present invention will now be described. It is however, to be noted that, in each of FIGS. 3A and 3B, only waveforms of signals associated respectively with the signal electrodes $S_1$ and $S_2$ are shown. Those associated with the signal electrodes $S_3$ and $S_4$ are neither illustrated nor described for the sake of brevity.

Starting from the timing $t=0$, the scanning electrodes $L_1$ and $L_2$ included in the first electrode group $C_1$ are brought into a selected state during each selection time $T_0$ (second) of the scanning electrodes. Thereby, the picture elements $A_{11}$, $A_{21}$, $A_{12}$, $A_{22}$, ... are set in dark, bright, dark, bright ... memory states, respectively. Subsequently, and starting from the timing $t=2T_0$, the scanning electrodes $L_1$ and $L_2$ are brought into the selected state with all of the picture elements $A_{11}$, $A_{21}$, $A_{12}$ and $A_{22}$ set in the dark memory state. Then, starting from the timing $t=6T_0$, the same scanning electrodes $L_1$ and $L_2$ are brought into the selected state with the picture elements $A_{11}$ and $A_{21}$ and the picture elements $A_{12}$ and $A_{22}$ set in the dark and bright memory states, respectively. In this way, the picture elements on the scanning electrodes $L_1$ and $L_2$ included in the first electrode group $C_1$ are caused to effect a display in $2^3$ gradations.

Simultaneously with the foregoing operation, starting from the timing $t=4T_0$ (second), the scanning electrodes $L_3$ and $L_4$ included in the second electrode group $C_2$ are brought into a selected state during each selection time $T_0$ to cause all of the picture elements $A_{31}$, $A_{41}$, $A_{32}$ and $A_{42}$ to be set in a bright memory state. Subsequently and starting from the timing $t=8T_0$ (second), the same scanning electrodes $L_3$ and $L_4$ are brought into the selected state to cause the picture elements $A_{31}$ and $A_{32}$ and the picture elements $A_{41}$ and $A_{42}$ to be set in the dark and bright memory states, respectively. Again, starting from the timing $t=10T_0$ second), the sauce scanning electrodes $L_3$ and $L_4$ are brought into the selected state to cause the picture elements $A_{31}$ and $A_{41}$ and the picture elements $A_{32}$ and $A_{42}$ to be set in the dark and bright memory states, respectively. In this way a display in $2^3$ gradation can be accomplished with respect to the second electrode group $C_2$.

Thus, during the one-frame time width $T_{F3}=14T_0$ (See the equation (28)), all of the picture elements associated with the first and second scanning electrode groups $C_1$ and $C_2$ can be caused to effect a display in $2^3$ gradations. It is to be noted that, according to the driving method described in connection with the prior art and when such driving method was practiced under identical conditions described in connection with the illustrated embodiment, the one-frame time width has been required to be $28T_0$ (second). Therefore, it is clear that, with the illustrated embodiment, a display speed which is twice that achieved by the conventional method can be realized, and, accordingly, the liquid crystal display device 1 can be more efficiently driven.

The respective waveforms of the voltages shown in each of FIGS. 3A and 3B can be obtained by applying signals of the waveforms, shown in FIG. 2, to the liquid crystal display device 10.

An input data signal D supplied through a line 11 is inputted to four shift registers 21 to 24 while sequentially shifted in response to a basic clock signal C supplied through a line 12. Respective outputs from these shift registers 21 to 24 are supplied through associated registers 25 to 28 to drive circuits 31 to 34 for driving the signal electrodes S1 to S4, respectively. These four registers 25 to 28 are supplied with a common horizontal clock signal H whose waveform is shown by (1) in FIG. 2).

With respect to the scanning electrodes, a first selection signal SE1 (whose waveform is shown by (2) in FIG. 2) necessary to bring the first electrode group $C_1$ into the selected state and a second selection signal SE2 (whose waveform is shown by (3) in FIG. 2) necessary to bring the second electrode group $C_2$ into the selected state are supplied respectively through lines 14 and 15.

The first selection signal SE1 is supplied to shift registers 35 and 36 while shifted according to the horizontal clock signal H. Outputs from the shift registers 35 and 36 are supplied to drive circuits 41 and 42 for driving the scanning electrodes $L_1$ and $L_2$. Similarly, the second selection signal SE2 is supplied to shift registers 37 and 38 which are shifted according to the horizontal clock signal H, respectively. Outputs from these shift registers 37 and 38 are in turn supplied to drive circuits 43 and 44 for driving the scanning electrodes $L_3$ and $L_4$, respectively.

In this manner, the voltages of the waveforms shown in, for example, FIGS. 3A and 4A can be applied to the associated electrodes, wherefore the driving method according to the present invention can be realized.

From the foregoing description, it is clear that, according to the driving method of the present invention, the time required to accomplish a display in multiple gradations can be considerably reduced. Also, according to the driving method of the present invention, the greater the number of gradations, the more considerably the time required for the display is reduced.

Although the present invention has been described in connection with the preferred embodiment thereof with reference to the accompanying drawings, it is to be noted that various changes and modifications are apparent to those skilled in the art. Such changes and modifications are, unless then depart from the scope of the present invention, to be construed as included therein.

What is claimed is:

1. A method for driving a liquid crystal display device comprised of a matrix of columns and row electrodes intersecting with each other, and forming a display picture element at each point of intersection between said column and row electrodes, each said display picture element adapted to be selectively set in one of bright and dark memory states so as to achieve a desired multi-gradation display, the driving method comprising the steps of:

(1) dividing, to achieve a multi-gradation display of $2^n$ levels (n being an integer not smaller than 3), the row electrodes into K groups of row electrodes wherein K is an integer not smaller than 2 and has the following relationship, $$K \leq \frac{(2^n - 1)}{n};$$

(2) defining the number Z of row electrode lines in each group of the row electrodes, wherein y represents the total number of row electrodes and Z is a positive integer and has the following relationship, $$Z \geq \frac{Y}{K};$$

(3) defining one frame period $T_F$, composed of $(2^n - 1)$ time blocks, to have the following relationship, $$T_F = (2^n - 1) Z t_0,$$

wherein $T_0$ represents the selection time during which the picture elements on each of the row electrodes are selectively set in one of the bright and dark memory states;

(4) sequentially selecting each one of said K groups of the row electrodes, during a time width $ZT_0$ defining each of the time blocks, such that each picture element in the selected one of the groups of the row electrodes can be set in one of the bright and dark memory states according to a predetermined selection signal; and (5) selecting a number of time blocks, not smaller than n, that the K groups of the row electrodes, during each one-frame period $T_F$, will reset each picture element according to said predetermined signal wherein each predetermined selection signal for each of said K groups, is determined such that each of said K groups will operate so as to reset picture elements during different of said time blocks, said selected number of time blocks being equal for each of said K groups, thereby allowing for an efficient multi-gradation display device.

2. A method for driving a matrix type liquid crystal display device comprising intersecting column and row electrodes, wherein picture elements are formed at each column and row intersection, so as to achieve a selective multi-level gradation display capability at each of said picture elements, said driving method comprising the steps of:

(a) selecting a desired gradation level;
(b) sequentially applying voltage to each of said column electrodes in response to an input data signal;
(c) dividing said row electrodes into groups, the number of row electrodes in each group and the number of groups being dependent upon said desired gradation level;
(d) defining a frame time period over which voltage will be applied, at selected times, to each row electrode group to achieve said desired gradation levels;
(e) dividing said frame time period into a number of equal time blocks, said number of equal time blocks being dependent upon said desired gradation level;
(f) selecting certain of said time blocks, the number of said time blocks being dependent upon said desired gradation level, during which voltage will be applied to a first group of row electrodes;
(g) selecting different ones of said time blocks, equal in number to said time blocks selected in step (f), during which voltage will be applied to a next group of row electrodes;
(h) repeating step (g) for each of said groups of row electrodes;
(i) sequentially selecting each of said row electrodes in each group, during sequential frame time periods, and applying voltage to said row electrodes during each previously selected time blocks during sequential frame time periods to thereby achieve a selectable multi-level gradation display at each of said pixel elements.

3. A method, as claimed in claim 2, wherein said selected desired gradation level is selectable from a multiple of two.

4. A method for efficiently driving a matrix type liquid crystal display device comprising intersecting column and row electrodes, wherein picture elements set in an initial bright or dark memory state are formed at each column and row intersection and are selectively reset to one of a bright or dark memory state, for a certain time period, to thereby achieve a selectable multi-level gradation display device, (a) selecting a desired gradation level;
(b) dividing said row electrodes into K groups dependent upon the desired gradation level selected;
(c) defining a number Z of row electrodes in each of said K groups by dividing the total number of electrodes Y by said number of K groups;
(d) defining a frame time period during multiples of which said selectable multi-level gradation display will be achieved;
(e) dividing said frame time period into time blocks, said number of blocks being dependent upon said gradation level;
(f) preselecting a number of different time blocks for each of said K groups, during which voltage will be supplied to each of said K groups, said number of time blocks being equal for each of said K groups;
(g) selectively applying voltage, through each of said K groups to thereby reset the memory state to a different memory state than had previously been set for each picture element corresponding to each of said K groups during said preselected time blocks of multiple frame time periods to thereby achieve an efficient, selectable, multi-gradation display device.

5. A method, as claimed in claim 4, wherein said selectable desired gradation level is selectable from a multiple of two.

6. A method, as claimed in claim 4, wherein said step (g) is repeated to continually maintain said selected desired gradation level, for each ensuing frame time period, the total frame time periods being equal in number to aid Z row electrodes in each K group.

* * * * *